United States Patent [19]

Moore

[11] 3,749,825

[45] July 31, 1973

[54] AUTOMATIC HUE CONTROL CIRCUIT

[75] Inventor: John H. Moore, Broadview, Ill.

[73] Assignee: Zenith Radio Corporation, Chicago, Ill.

[22] Filed: Dec. 16, 1971

[21] Appl. No.: 208,770

[52] U.S. Cl. .......... 178/5.4 HE
[51] Int. Cl. .......... H04n 9/12
[58] Field of Search .......... 178/5.4 R, 5.4 HE

[56] References Cited

UNITED STATES PATENTS

| | | | |
|---|---|---|---|
| 3,647,941 | 3/1972 | Andrade et al. | 178/5.4 HE |
| 3,668,306 | 6/1972 | Hansen et al. | 178/5.4 HE |

*Primary Examiner*—Richard Murray
*Attorney*—Donald B. Southard, Nicholas A. Camasto et al.

[57] ABSTRACT

A novel automatic hue control arrangement wherein only the (B–Y) color-difference signal is altered from nominal, and only within a predetermined, limited range about reference fleshtone axis. The result is more pleasing fleshtone hues of a substantially less monochrome cast since those hues outside the fleshtone range remain completely unaltered. Accordingly, the grass remains green, the sky blue. In the preferred embodiment, a correction voltage is readily and conveniently derived from the processed (R–Y) and (G–Y) color-difference information and added to the nominal (B–Y) signal so as to provide essentially uniform response therefor over the predetermined range about nominal fleshtone. A viewer-operated switch is provided for selecting the normal or fleshtone compensating mode for the receiver.

9 Claims, 4 Drawing Figures

AUTOMATIC HUE CONTROL CIRCUIT

BACKGROUND OF THE INVENTION

This invention relates generally to improvements for color television receivers and more particularly to novel automatic hue control circuitry for such receivers wherein phase errors or variations in color signal information otherwise discernible in the reproduced image as undesirable departures in fleshtone hues are effectively minimized without significantly affecting the remaining hues which do not require correction or modification.

The conventional color television receiver functions on a received signal having a main carrier amplitude modulated by brightness, or luminance, information and chrominance information in the form of amplitude and phase modulation of a suppressed subcarrier. The reference for the demodulation of the chrominance information is provided by a few cycles of a color burst signal utilized to synchronize the output of an included reference oscillator. The generation, transmission and derivation of luminance, scanning and color information are accomplished in accordance with prescribed NTSC standards established for the television industry.

Appropriate chroma processing circuitry is included in the receiver for color carrier regeneration and the demodulation of the color sideband information in the form of suitable color difference signals. The derived color difference signals are then utilized in combination with extracted luminance information to provide appropriate primary color signals for selective application to the receiver picture tube, whereby the televised image is reproduced in color. The final matrixing of the demodulated color difference signals and luminance information may be matrixed within the picture tube itself or before application thereto in a separate video matrix network.

In any event, if the reference or color burst signal and the respective color control signals are correctly developed and transmitted, and then subsequently detected and correctly demodulated in the receiver, the reproduced image may be expected to exhibit substantially faithful color fidelity. However, even though the color burst signal is included as a reference, errors can and do develop which affect color fidelity as a whole. These errors are usually in the form of differences in phase in various of the color information components which alters the time base on which demodulation must depend. Such errors in phase may be the result of differing standards employed as between respective television stations, by operational differences in cameras or other related station equipment, by the use of tapes or films, and still other factors. It will be appreciated that such errors readily manifest themselves as discernible variations in fleshtone hues.

Provision is customarily included in most conventional color receivers for changing hue, or "tint", according to need or preferences of the viewer. However, it may nevertheless prove somewhat annoying or at least inconvenient for the viewer to make as frequent corrections as might be required to compensate for hue variations such as those attributable, for example, to the use of film or other mechanical recording media interspersed with live studio presentations.

It might be noted that various automatic hue or "tint" control arrangements have been tried in the past in an effort to maintain correct or at least acceptable fleshtone hues in the reproduced image despite the occurrence of phase errors as previously described. However, all such tint control circuits have been found to be deficient in one aspect or another. For example, a common operational characteristic noted in the prior arrangements pertains to the overshifting of hues close to or in the vicinity of fleshtones. That is, while the face of an individual in a reproduced image may be of an acceptable hue, the lips, and perhaps even the hair of the individual, are likewise shifted to fleshtone. The same may be true for other objects in the yellow-orange-red sector of the chroma scale. The end result is a decided monochrome effect.

In still another aspect, many of the prior circuit arrangements give rise to undesirable shifting of hues other than, and far removed from, nominal fleshtones. That is, when the subject automatic tint control is activated to compensate for improper fleshtones, suitable compensation may be effected, but other hues may likewise be shifted, as well. Thus, the grass in a televised scene may no longer be green but blue; the sky may take on a pronounced purplish cast.

Accordingly, it is an object of the present invention to provide an improved automatic hue control circuit for maintaining correct or acceptable fleshtone hues which does not have the foregoing limitations and disadvantages.

Another object of the present invention is to provide an automatic hue control circuit of the foregoing type which has a restricted range of correction or compensation limited to the fleshtone hues.

Still another object of the present invention is to provide an automatic hue control circuit of the foregoing type wherein the correction that is effected does not produce a monochrome cast and hues other than the fleshtones remain unaffected.

Yet another object of the present invention is to provide an automatic hue control circuit of the foregoing type which modifies only the derived (B–Y) color-difference signal over a predetermined range without affecting or otherwise altering the (G–Y) and (R–Y) color-difference signals.

Another object of the present invention is to provide an automatic hue control circuit for maintaining correct fleshtone hues which is nonetheless relatively simple in operation, inexpensive to fabricate, and which is especially suited for adaptation to integrated circuit form.

SUMMARY OF THE INVENTION

The present invention relates to an automatic hue control arrangement to correct undesirable variations in fleshtone hues of a television image resulting from phase errors or the like in various of the color components of the television signal. In its broader aspects, the invention contemplates modifying only the (B–Y) color-difference signal information as derived from the associated chroma demodulator, the same being the most critical factor in the composition of fleshtone hues, and further, effecting such alteration only within a predetermined, limited range about the nominal fleshtone axis.

In a preferred embodiment, portions of the (R–Y) and (G–Y) signal information are respectively amplified, inverted and then combined in a manner to provide a particularized correction control voltage which, when summed with the (B–Y) color-difference signal, as initially derived, produces a modified (B–Y) signal exhibiting essentially uniform response over the desired predetermined range. Changes in phase for the modified (B–Y) signal within this range accordingly do not produce a corresponding change in signal amplitude. Fleshtones remain fleshtones and objectionable and unnatural casts are effectively avoided. At the same time, all other hues remain unaltered. A relatively simple circuit is devised for effecting the desired modification of the (B–Y) color-difference signal, which circuitry is readily adaptive to integrated circuit form. Further, a resistive matrix network is included which permits a wide tolerance in the d-c operating characteristics of the associated chroma demodulator circuitry.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in which:

Figure 1:
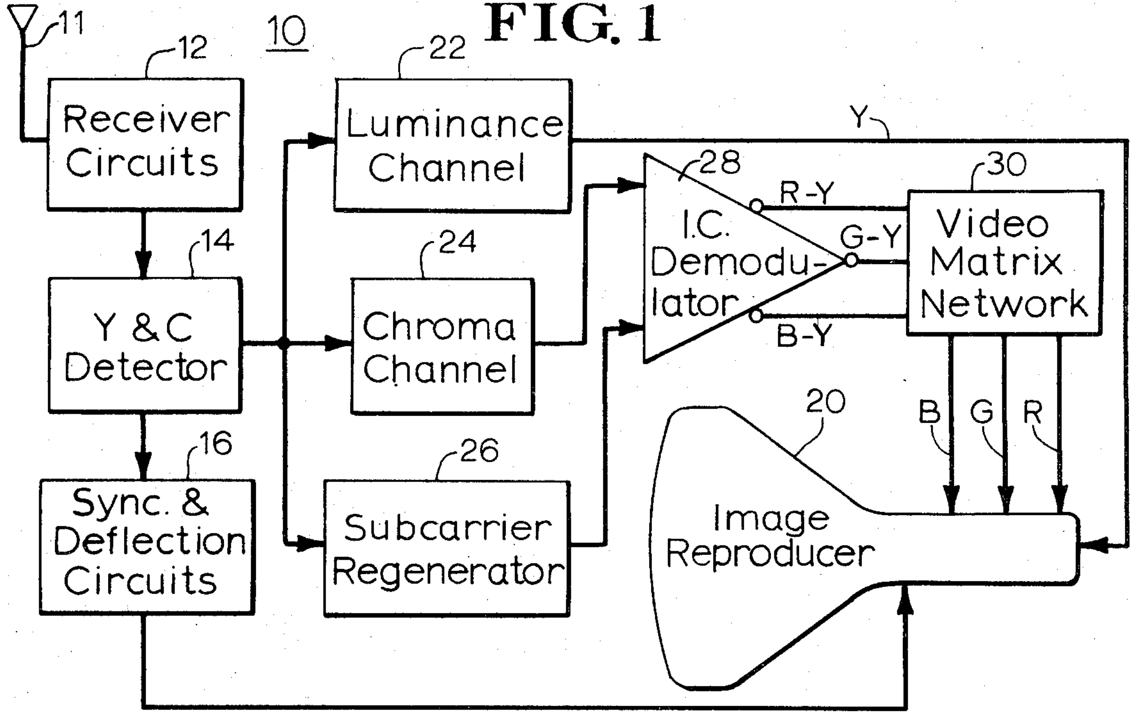
FIG. 1 is a representation in block diagram form of a color television receiver which incorporates the present invention.

Referring now to the drawings, a typical color television receiver is shown at 10 in FIG. 1 in block diagram form. The incoming television signals are picked up by the antenna 11 and fed to the usual television circuitry at the front end of the receiver and identified in block form at 12. Receiver circuitry 12 serves to process the received signals by converting radio frequency signals to intermediate or IF signals by means of conventional and known techniques. These techniques may employ a mixer and a local oscillator together with suitable stages of amplification. A luminance (L) and chrominance (C) detector included in rectangle 14 is responsive to the IF signals to derive therefrom a composite video signal. The composite video signal is then applied to the sync and deflection circuits such as identified at 16 wherein suitable deflection signals are derived for application to the image reproducer 20 for deflecting the respective electron beams both horizontally and vertically and effect proper representation of the television display.

The derived composite video signal is further applied to a luminance channel 22, a chrominance channel 24, and subcarrier regenerator arrangement shown at 26. The luminance channel 22 develops the luminance or brightness information for the televised image and applies the same to the image reproducer 20. Chroma or color information is extracted and processed by the chrominance channel 24 while the subcarrier regenerator 26 develops a suitable reference signal in response to the burst component of the composite video signal. This reference signal corresponds to the chroma carrier required for effecting appropriate demodulation of the respective color signals. Accordingly, the extracted chroma information forms one input to a chroma demodulation arrangement, such as identified at 28, while the reference signal from the subcarrier regenerator 26 forms the other of the inputs, as indicated. The respective chroma information is suitably demodulated in the presence of the regenerated chroma carrier to form the conventional three color-difference signals, (R–Y), (G–Y) and (B–Y), in the manner understood in the art. Further matrixing is required between the respective color-difference signals and the derived luminance signal to form the final primary control signals applied to appropriate control electrodes of the image reproducer. This final matrixing may be effected prior to application to the image reproducer or, alternatively, within the image reproducer itself, as desired. In the illustration of FIG. 1, the matrixing for deriving the primary color control signals is accomplished within a separate video matrix circuit; identified at 30. The output of video matrix are the final primary color control sequals R, G & B.

As thus far described, the structure and operation of the television receiver set forth in FIG. 1 is entirely conventional and will be readily understood by those skilled in the art and further and more detailed description thereof is deemed unnecessary. Accordingly, attention may now be directed to that portion of the television receiver 10 forming an embodiment of the present invention.

As previously described, if the reference and chroma signal information is correctly developed and transmitted, and then subsequently detected and correctly demodulated in the receiver, the reproduced image may be expected to exhibit reasonably faithful color fidelity. However, even though the burst signal is included as a reference in the television signal, errors can and are introduced which result in less than optimum color fidelity. These errors often take the form of differences in phase for the various color information components which alter the time base on which demodulation must depend. Such errors thus readily manifest themselves as discernible variations in fleshtone hues. Provision is included in most receivers in shift hue according to individual preference, such as a manually operated hue control, or alternatively, an automatic hue control system, which up to now includes several unattractive aspects.

Figure 2:
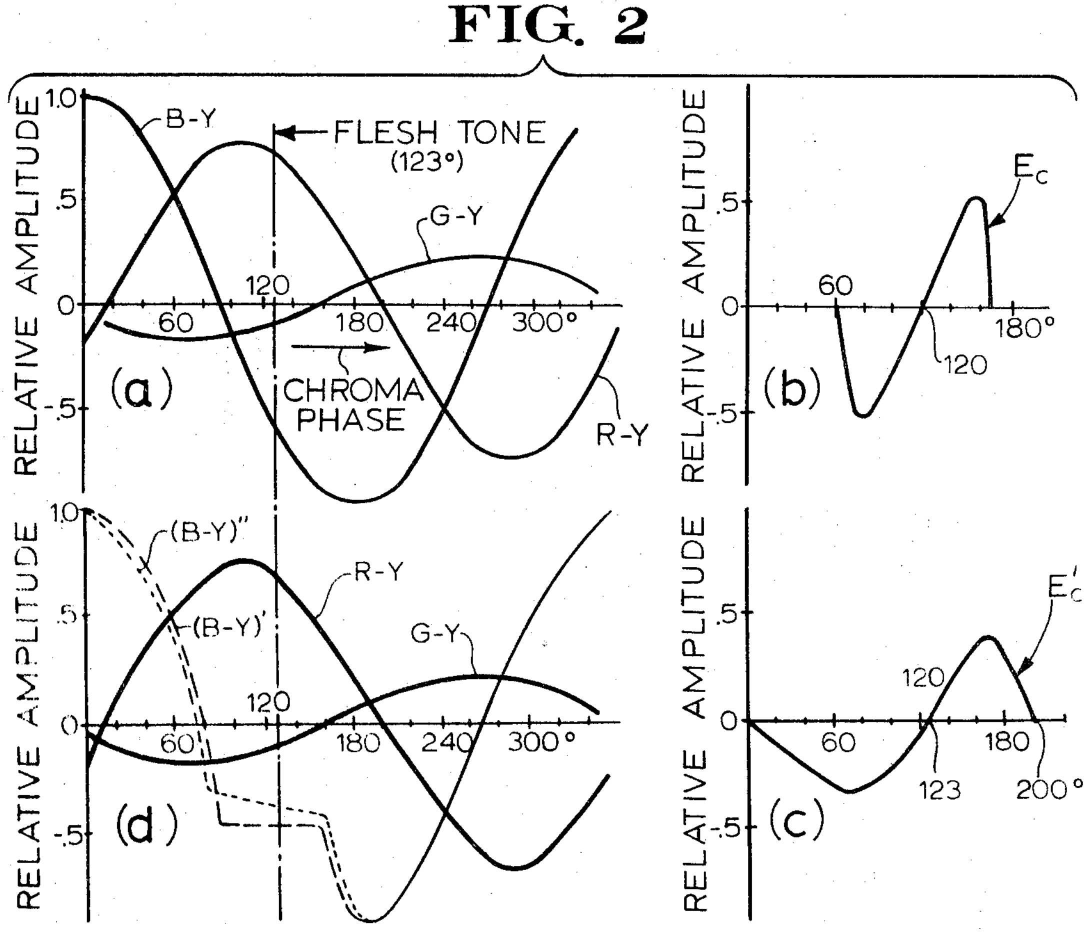
FIGS. 2*a* through 2*d* are various wave form representations useful in understanding certain important aspects of the present invention.

The present invention rests upon an essentially new and novel approach with respect to automatic hue or tint control systems. It is founded on two important characteristics so as to provide appropriate correction to fleshtones without affecting those hues which do not require correction. The first such aspect relates to the factor most critical in fleshtone hue variations, namely, the (B–Y) color-difference signal. This can be more readily appreciated by reference to FIG. 2*a*, representing a plot of the respective chroma demodulator outputs versus the phase of a constant amplitude chroma input. Accordingly, it will be noted that, for chroma phases near fleshtone hues, i.e., the axis at approximately 123°, the (R–Y) signal is near its point of maximum amplitude and minimum slope. A change in phase obviously will not effect a significantly large change in the overall magnitude of the (R–Y) color signal, and even less of a discernible change in the composite fleshtone itself, since it is composed of all three color-difference signals. The same is true of any phase changes with respect to the (G–Y) color-difference signal. This is because the magnitude of the (G–Y) signal is relatively small to begin with as compared to the (R–Y) and (B–Y) signals. Accordingly, while a change in phase with respect to the (G–Y) signal may have an effect on the signal level at the fleshtone axis, particularly in one direction, the overall change will nevertheless be relatively small. As will be apparent from FIG. 2*a*, by far the most critical in the composition of fleshtone hues is the (B–Y) color-difference signal. Not only is the magnitude thereof substantial, but the (B–Y) signal is also at or near its maximum slope at the referenced 123° fleshtone axis. A slight shift or variation in phase for the (B–Y) signal, in either direction, results in a substantial change in amplitude level about the nominal fleshtone axis, giving rise to undesirable variations in the range of fleshtone hues.

The other factor to be taken into consideration regarding automatic hue control arrangements generally is somewhat subjective in nature and is in fact unique to fleshtones. This factor relates to the impression made upon the viewer regarding the composition of fleshtone hues. It is a demonstrable fact that the amount of blue in a reproduced image comprising fleshtone hue is far more critical than, say, for red. When the level of red is too high, the impression is simply one of a somewhat rosey cast, but in no way objectionable or unnatural. However, when the level of blue is too high, the effect is one of an unnatural purple fleshtone cast.

Accordingly, the present invention takes into account the two aforementioned properties with respect to fleshtone hues and provides a fully automatic hue control system which corrects only the (B–Y) color-difference signal information regarding the effect of undesirable phase shifts from the nominal, and further, only in a predetermined, limited range encompassing the fleshtone axis. The (B–Y) is the only color-difference signal which will be affected by this correction, the normal (R–Y) and (G–Y) variations usually encountered will remain unaffected, thereby producing fleshtones which are more natural looking and not of the usual monochrome cast prevalent in prior systems.

One way to accomplish the foregoing is to develop an appropriate correction signal, say $E_c$, which when added to the nominal or unmodified (B–Y) color-difference signal will effect a modified (B–Y)′ signal having a constant amplitude, and thus minimum slope, about the nominal fleshtone axis and extending for a predetermined range, e.g., ±60 degrees. A constraint to be imposed is that for normal fleshtones (i.e., those hues falling at or near the 123° axis), the correction signal $E_c$ will be zero and that the modified blue color-difference signal (B–Y)′ will be equal to the unmodified signal (B–Y). This constraint insures that there will be no correction for fleshtones which do not require it. Finally, the correction signal $E_c$ should be zero for all hues which are outside the range over which correction is desired, or in the illustrated example, below 60° and above 180°.

A suitable correction signal $E_c$ meeting the foregoing criterion is illustrated in FIG. 2*b*. This derived correction signal when added to the normal or unmodified (B–Y) color-difference signal as shown in FIG. 2*a* will result in modified color-difference signal identified generally at (B–Y)′ in FIG. 2*d*. As shown, the slope of the modified (B–Y)′ signal is more pronounced beginning at the 60° location and continues until a point at about 90° is reached. The amplitude of the modified (B–Y)′ signal remains substantially uniform until a point at about 160° is reached where the slope again declines to a point at about the 180° reference. Accordingly, any phase differences in the nominal (B–Y) color difference signal that may occur in the correction range (say, from about 90° to 150°) will not result in any significant changes in the amplitude of the (B–Y) signal. No unnatural purple fleshtones are permitted to occur, while (R–Y) and (G–Y) color-difference signals remain unaffected so as to avoid the objectionable monochrome impression encountered in previous automatic hue control systems. Grass will remain green, the sky blue, and the hair of an individual in a reproduced image will avoid an undesirable fleshtone look.

From a purely practical standpoint, however, it may not be particularly desirable for the derived correction signal $E_c$ to go from a large amplitude to zero amplitude as quickly and sharply as that depicted in FIG. 2*b*. For example, it is contemplated that the television receiver embodying the present invention will nevertheless retain the manual hue control adjustment to accommodate the personal preferences of the individual viewer. Accordingly, it will be appreciated that the sharp slope of the correction signal $E_c$ in FIG. 2*b* may well produce a large hue change with a slight movement of the viewer operated hue control.

FIG. 2*c* illustrates a more desirable correction signal, identified as $E_c'$, which can accomplish essentially the same correction aspects, but without a severe or abrupt change in signal amplitude. The correction signal $E_c'$ when added to the normal or unmodified (B–Y) color-difference signal (FIG. 2*a*) produces the modified color-difference signal (B–Y)″ as depicted in FIG. 2*d*. As indicated, the range over which such correction signal affects the normal (B–Y) signal is somewhat greater, but this compromise proves to be advantageous, since the $E_c'$ correction signal of FIG. 2*c* can be generated with a relatively simple circuit.

Figure 3:
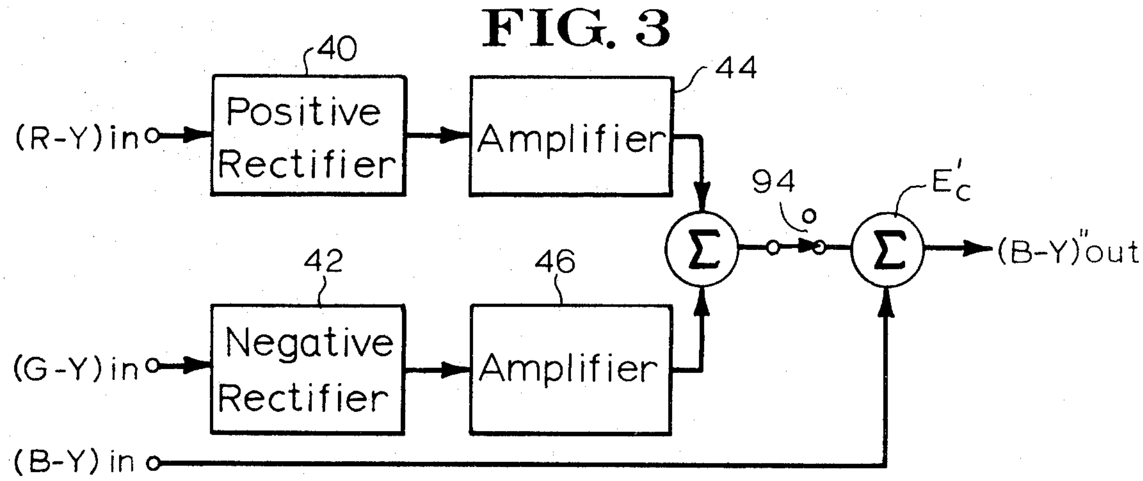
FIG. 3 is a representation in block diagram form of the circuit means to effect modification of the nominal (B–Y) color difference signal in accordance with the present invention.

The circuit for generating the correction signal $E_c'$ is shown diagrammatically in FIG. 3. A portion of the (R–Y) signal is applied to a positive rectifier 40 so that at its output only the positive going portion remains (i.e., from about 20° to about 200° as shown in FIG. 2*a*). A portion of the (G–Y) color-difference signal is applied to a negative rectifier 42 so that at its output only the negative portion thereof remains (or from about zero to about 160°). The two rectified signals are then amplified in associated amplifiers 44 and 46, respectively, so that appropriate levels of signal are provided which, when added together, will produce a zero amplitude at the nominal fleshtone axis. The result is the correction signal $E_c'$ as shown in FIG. 2*c*. Correction signal $E_c'$ may now be added to the normal or unmodified (B–Y)″ color signal shown in FIG. 2*d*.

Figure 4:
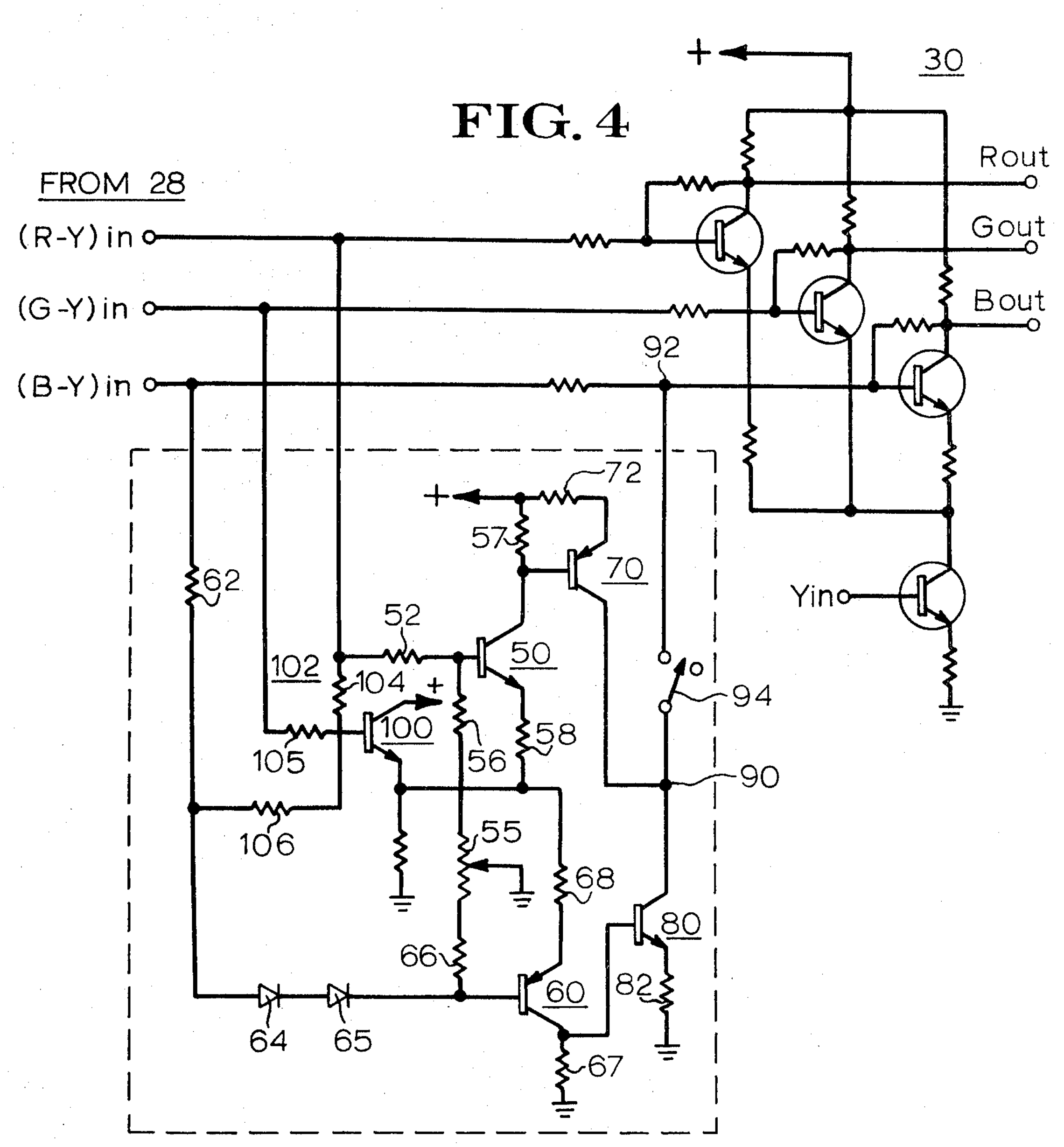
FIG. 4 is a detailed schematic representation of the circuitry shown in FIG. 3.

A suitable circuit for deriving the desired correction signal $E_c'$ is illustrated in FIG. 4. A first transistor amplifier 50 is provided to amplify and invert the (R–Y) color-difference signal as applied to its base-input electrode through a resistance 52. A further transistor amplifier 60 likewise amplifies and inverts the (G–Y) color-difference signal as applied to its base-input electrode through a resistance 62 and diodes 64–65. Biasing arrangements for transistor amplifiers 50 and 60 are completed by the fixed resistances 56 and 66 and the variable resistance or potentiometer 55, serially connected between the base-input electrodes of amplifiers 50 and 60, with the adjustable arm of potentiometer 55 being returned directly to ground. Operating power is provided to transistor amplifiers 50 and 60 by the resistance network comprising resistances 57, 58, 67 and 68 serially connected to form a current path between a source of power and a plane of reference potential or ground, which current path includes the collector-emitter circuits of transistor amplifiers 50 and 60.

A pair of transistors 70 and 80 are further provided to effect suitable rectification of the amplified and inverted (R–Y) and (G–Y) signals at the output collector electrodes of amplifiers 50 and 60, respectively. Transistor 70 has a base-input connected to the output-collector of transistor amplifier 50 while the transistor 80 has a input-base connected to the output-collector of transistor amplifier 60. Transistors 70 and 80 are effectively biased at cut-off so as to provide the desired rectification of the input signals. The currents from transistors 70 and 80 may then be summed at their common collector node, identified at terminal 90, which then forms the desired correction control signal $E_c'$. That is, the rectified positive half of the color-difference signal (R–Y) derived by transistors 50 and 70 is summed with the rectified negative half of color-difference signal (G–Y) derived by transistors 60 and 80, and in such proportions, so as to result in zero amplitude at or near nominal fleshtone axis. Accordingly, the overall configuration of the resulting wave form is that as shown in FIG. 2*c*.

The generated correction control signal $E_c'$ may now be combined or summed with the normal or unmodified (B–Y) color-difference signal to obtain the desired modified signal (B–Y)''. This is effected at the junction terminal identified at 92 forming the input to the blue matrix amplifier of video matrix 30 for deriving the blue primary control drive signal for application to the appropriate control element of the image reproducer 20. Video matrix network 30 matrixes the conventional color-difference signals (R–Y), (G–Y) and (B–Y) with the derived luminance signal Y to form the primary color drive signals R, G and B at respective outputs thereof. Video matrix 30 operates in a manner well understood in the art such that further and detailed operational description is deemed unnecessary.

As shown, a SPST switch 94 is interposed between summation terminals 90 and 92 to provide a choice of operating modes for the receiver. If switch 94 is open, the (B–Y) color-difference signal is developed in the normal manner and the operation of the receiver as a whole is entirely conventional. If switch 94 is actuated, a correction control signal $E_c'$ is developed and summed with the normal (B–Y) signal to form a modified (B–Y)'' color-difference signal as just described. It should be noted that switch 94 can be opened or closed without changing the "set-up" for the receiver 10, since transistors 70 and 80 have no quiescent operating current.

One final aspect for the circuit of FIG. 4 should be noted. Such circuitry is intended to operate in conjunction with the receiver's chroma demodulator. As shown in FIG. 1, demodulator 28 is in integrated circuit form and, as such, there is a relatively large tolerance in the magnitude of the d-c output voltage that can be expected. Accordingly, to effectively compensate, it is deemed necessary to bias the circuitry of FIG. 4 directly from the demodulator 28. This is accomplished by the further transistor amplifier 100 and the resistance matrix network 102 comprising resistors 104, 105 and 106 connected between the base-input of transistor amplifier 100 and the respective outputs of the demodulator 28, represented in FIG. 4 as the individual sources of color-difference signals (R–Y), (G–Y) and (B–Y). The values for resistors 104, 105 and 106 are chosen such that the chroma signal information presented to the base-input of transistor amplifier 100 effectively cancels and only a substantially unidirectional reference voltage remains for the bias of the circuit. In an arrangement found to provide satisfactory operation, resistor 104 has a selected value of approximately 19,600 ohms, resistor 105 a value of 50,000 ohms and resistor 106 a value of 5,200 ohms. A more complete operational description of a resistance matrix network, such as depicted at 102, and the generation of a reference control voltage representative of the d-c quiescent operating level of an associated chroma demodulator in monolithic form, is set forth in a co-pending application, Ser. No. 77,769, filed Oct. 5, 1970, now U.S. Pat. No. 3,701,843, issued Oct. 31, 1972, in behalf of Charles F. Hepner, and assigned to the same assignee as the present invention.

With the exception of switch 94, it will be noted that the circuitry of FIG. 4 with the dotted line outline, does not include any inductance elements. As such, it is readily and conveniently adaptive to integrated circuit form in a single monolithic chip, or alternatively, included in the integrated circuitry forming the chroma demodulator 28.

While particular embodiments of the invention have been shown and described herein, it will be obvious to those skilled in the art that various modifications and alternative constructions may be made without departing from the true scope and spirit of the present invention in its broader aspects, and, therefore, the aim in the appended claims is to cover all such changes and modifications as may fall within the true scope and spirit of the invention.

I claim:

1. In a color television receiver including signal processing circuitry for extracting and processing luminance information from a main carrier and color reference information from a modulated subcarrier, an automatic hue control arrangement for maintaining substantially true fleshtone hues, comprising in combination:

circuit means for deriving from the color reference information a plurality of color control signals, one of which represents the blue component in the reproduced image;

means for generating a correction control signal having given amplitude variation over a predetermined range and substantially zero amplitude at a reference location corresponding to nominal fleshtone hues;

means for summing said correction control signal and said color control signal representing the blue component in the reproduced image whereby the resultant modified color control signal exhibits essentially uniform amplitude over said predetermined range about said nominal fleshtone reference location; and switch means for selectively activating said means for summing said correction control signal and said one color control signal.

2. An automatic hue control arrangement in accordance with claim 1 wherein said correction control signal has an essentially sinusoidal configuration and wherein said predetermined range over which said modified color control signal exhibits essentially uniform amplitude extends approximately 60° above and below said nominal fleshtone reference location.

3. An automatic hue control arrangement in accordance with claim 1 wherein said means for activating said summing means to modify said one color control signal comprises a viewer operated control switch.

4. An automatic hue control arrangement in accordance with claim 1 wherein said color control signals comprise respective (R–Y), (G–Y) and (B–Y) color-difference signals and wherein said means for generating said correction control signal includes means for selectively rectifying and amplifying a portion of said (R–Y) and (G–Y) color-difference signals, and means for summing said rectified and amplified (R–Y) and (G–Y) signal components.

5. An automatic hue control arrangement in accordance with claim 4 wherein the positive half cycle of the (R–Y) signal is rectified and the negative half cycle of the (G–Y) signal is rectified and wherein said rectified (R–Y) and (G–Y) signal components are selectively amplified to a level which upon being summed together results in a correction control signal having essentially zero amplitude at said nominal fleshtone reference location.

6. In a television receiver for reproducing color images and including signal processing circuitry for extracting and processing luminance information from a main carrier and color reference information from a modulated subcarrier, an automatic hue control arrangement for maintaining substantially true fleshtone hues, comprising in combination:

circuit means for deriving from the color reference information a plurality of color control signals representative of primary red, blue and green color components in the reproduced image;

amplifier means for amplifying respective red and green color control signals at a given level;

rectifier means for rectifying the positive half cycle of said amplified red color control signal and for rectifying the negative half cycle of said amplified green color control signal;

means for summing said rectified and amplified red and green color signal components to form an essentially sinusoidal correction control signal having substantially zero amplitude occurring at a reference location corresponding to nominal fleshtone hues; and means for summing said correction control signal and said blue control signal to form a modified blue color control signal exhibiting essentially uniform response over a predetermined range encompassing said nominal fleshtone reference location.

7. An automatic hue control arrangement in accordance with claim 6 wherein said amplifier means includes a pair of complementary transistors having input, output and common electrodes, and said rectifier means includes an additional pair of complementary transistors having input, output and common electrodes and biased at cut-off, said red and green color control signals being applied to said input electrodes of said amplifier transistors, said output electrodes of said amplifier transistors being connected to respective input electrodes of said rectifiers, and wherein said means for summing the rectified and amplified red signal components comprises a common junction terminal between said output electrodes of said rectifiers.

8. An automatic hue control arrangement in accordance with claim 7 wherein said amplifier, rectifier and summing is in integrated circuit form and wherein further means, including resistive matrix means, are provided for compensating for changes in the d-c output voltage level for said circuit means deriving said plurality of color control signals.

9. An automatic hue control arrangement in accordance with claim 7 wherein said amplifier for amplifying the red color control signal is a NPN transistor, said amplifier for amplifying the green color control signal is a PNP transistor, said rectifier for rectifying the amplified red signal component is a PNP transistor, and said rectifier for rectifying the amplified green signal component is a NPN transistor.

* * * * *